(12) United States Patent
Choi et al.

(10) Patent No.: US 9,871,266 B2
(45) Date of Patent: Jan. 16, 2018

(54) DEVICE FOR WINDING ELECTRODE PLATE

(71) Applicant: SAMSUNG SDI CO., LTD., Yongin-si, Gyeonggi-do (KR)

(72) Inventors: Kyungtaek Choi, Yongin-si (KR); Gibong Cho, Yongin-si (KR); Dongwoo Kim, Yongin-si (KR); Soonhak Hwang, Yongin-si (KR); Seunghwan Lee, Yongin-si (KR); Jinuk Hong, Yongin-si (KR); Kyuho Kim, Yongin-si (KR); Sangjin Maeng, Yongin-si (KR); Jungki Min, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 381 days.

(21) Appl. No.: 14/754,667

(22) Filed: Jun. 29, 2015

(65) Prior Publication Data

US 2016/0036085 A1 Feb. 4, 2016

(30) Foreign Application Priority Data

Aug. 1, 2014 (KR) .................. 10-2014-0099224

(51) Int. Cl.
*B21F 3/04* (2006.01)
*H01M 10/04* (2006.01)
*B65H 23/28* (2006.01)

(52) U.S. Cl.
CPC ........ *H01M 10/0409* (2013.01); *B65H 23/28* (2013.01); *B65H 2301/414324* (2013.01);

(Continued)

(58) Field of Classification Search
CPC ......... H01M 10/0409; H01M 10/0413; H01M 10/0418; B65H 2301/414326;

(Continued)

(56) References Cited

U.S. PATENT DOCUMENTS

| 4,099,401 | A | * | 7/1978 | Hug | ....................... | B65H 81/06 |
| | | | | | | 29/623.1 |
| 4,158,300 | A | * | 6/1979 | Hug | .................. | H01M 10/0409 |
| | | | | | | 29/623.1 |
| 5,091,273 | A | * | 2/1992 | Hug | ....................... | H01M 6/10 |
| | | | | | | 29/623.4 |
| 2003/0140482 | A1 | * | 7/2003 | Murata | ............. | H01M 10/0409 |
| | | | | | | 29/623.1 |

(Continued)

FOREIGN PATENT DOCUMENTS

| KR | 2000-0013985 | 7/2000 |
| KR | 10-2011-0074374 | 6/2011 |

*Primary Examiner* — Emmanuel M Marcelo
(74) *Attorney, Agent, or Firm* — Lewis Roca Rothgerber Christie LLP

(57) ABSTRACT

A device for winding an electrode plate includes a feed roller configured to guide a first electrode plate or a second electrode plate, each of the first electrode plate and the second electrode plate including a plurality of electrode tabs protruding from one side, a deformation reducing member spaced apart from an outer circumferential surface of one end of the feed roller and configured to guide the electrode tabs fed to the feed roller to be brought into close contact with the outer circumferential surface of the one end of the feed roller to reduce deformation of the electrode tabs, and a winding unit configured to wind together the first electrode plate or the second electrode plate transferred by the feed roller and a separator interposed between the first electrode plate and the second electrode plate.

15 Claims, 7 Drawing Sheets

(52) U.S. Cl.
CPC ......... *B65H 2301/414326* (2013.01); *B65H 2404/147* (2013.01); *B65H 2404/6111* (2013.01); *B65H 2404/7431* (2013.01); *B65H 2601/22* (2013.01); *B65H 2701/132* (2013.01); *B65H 2701/173* (2013.01); *B65H 2801/72* (2013.01); *H01M 2220/20* (2013.01); *H01M 2220/30* (2013.01)

(58) Field of Classification Search
CPC ......... B65H 23/28; B65H 2404/6111; B65H 2404/7431; B65H 2701/132; B65H 2701/173; B21C 47/34; B21C 47/3466; B21C 47/3416
See application file for complete search history.

(56) References Cited

U.S. PATENT DOCUMENTS

| | | | |
|---|---|---|---|
| 2010/0124694 A1 | 5/2010 | Hikata et al. | |
| 2011/0297780 A1* | 12/2011 | Feng | H01M 10/0409 242/444 |
| 2012/0321924 A1* | 12/2012 | Ahn | H01M 2/022 429/94 |
| 2013/0071712 A1* | 3/2013 | Sasaki | H01M 10/0431 429/94 |
| 2015/0263375 A1* | 9/2015 | Redmann | H01M 10/0583 29/623.1 |
| 2016/0197372 A1* | 7/2016 | Sawada | H01M 2/1686 429/246 |
| 2016/0372779 A1* | 12/2016 | Hwang | H01M 10/0409 |

\* cited by examiner

DEVICE FOR WINDING ELECTRODE PLATE

CROSS-REFERENCE TO RELATED APPLICATION

This application claims priority to and the benefit of Korean Patent Application No. 10-2014-0099224, filed in the Korean Intellectual Property Office on Aug. 1, 2014, the entire content of which is incorporated herein by reference.

BACKGROUND

1. Field

One or more embodiments described herein relate to a device for winding an electrode plate.

2. Description of Related Art

Some secondary batteries provide a power storage device that provides a high energy density for storing energy by converting electric energy into chemical energy. Secondary batteries are configured to be rechargeable, unlike primary batteries that are not configured to be rechargeable, and are widely used in integrated circuit (IC) devices, such as cellular phones, notebook computers, tablet PCs, or the like. Recently, due to an increase in oil prices, electric vehicles are drawing attention and there is an increasing tendency of using secondary batteries as power sources for electric vehicles. With such a trend, some secondary batteries may need to provide such characteristics as high density, high capacity, high output, stability, and so on.

For example, in order to fabricate a high-capacity secondary battery, an electrode plate coated with as much electrode active material as possible (or practical) may be wound in the same or substantially the same volume of a can. In order to increase an amount of the electrode active material coated on the electrode plate, an area occupied by a current collector within the can may be reduced.

In order to reduce the area of the current collector, a multi-tab electrode assembly structure has recently been developed. For example, a multi-tab electrode assembly includes multiple tabs (a plurality of tabs) formed by aligning uncoated portions having or notched in multiple tab shapes (a plurality of tab shapes) during winding of an electrode plate. Since the multi-tabs serve as the current collector, the area of the current collector occupied in the can may be greatly reduced, as compared to an area of a current collector that does not include a multi-tab electrode.

In order to form a current collector having a particular (or set) shape in an electrode plate, such as a tab, a notching device based on or utilizing a molding method or a laser method, may be used. The notching device, which may include an unwinding unit, a punching unit and a winding unit, punches a base material supplied as a reel in a suitable or desired shape, winds the punched base material in a reel-type (or reel-kind) and supplies the reel-type (or reel-kind) base material to a winding device for fabricating an electrode assembly.

When the base material having a notched tab of the winding device travels (or is utilized) in roll-to-roll equipment, the tab may be folded when the base material passes a roller due to drooping or sagging of the tab as a result of gravity or fluctuation. The folding of the tab may cause damage to a final product, making it difficult to use the completed electrode assembly. In addition, the folding of the tab may cause problems in adjusting the tension and traveling speed of the base material, thereby adversely or negatively affecting the yield of final products.

SUMMARY

Embodiments of the present invention are directed toward providing an electrode plate winding device, which can prevent an electrode tab formed at an electrode plate from being folded during being transferred through a roller during the manufacture of an electrode assembly (or can reduce a likelihood or amount of such an occurrence).

In accordance with one or more embodiments, an electrode plate winding device includes a device for winding an electrode plate including: a feed roller configured to guide a first electrode plate and a second electrode plate, each of the first electrode plate and the second electrode plate including a plurality of electrode tabs protruding from one side, a deformation reducing member spaced apart from an outer circumferential surface of one end of the feed roller and configured to guide the electrode tabs fed to the feed roller to be brought into close contact with the outer circumferential surface of the one end of the feed roller to reduce deformation of the electrode tabs; and a winding unit configured to wind together the first electrode plate and the second electrode plate transferred by the feed roller and a separator interposed between the first electrode plate and the second electrode plate.

The deformation reducing member may include a fixing part coupled to the one end of the feed roller so as not to be rotated with the feed roller, and a first guide part coupled to the fixing part to be spaced apart from the outer circumferential surface of the one end and positioned at an entering part at which the electrode tabs enter while making contact with the feed roller for the first time.

The fixing part may a ring shape corresponding to the one end of the feed roller.

The device may further include a second guide part extending from the first guide part and coupled to the fixing part to be spaced apart from the outer circumferential surface of the one end along the outer circumferential surface of the one end.

The second guide part may have an arc shape corresponding to portions of the outer circumferential surface of the one end, the portions being configured to make contact with the electrode tabs.

The second guide part may be spaced 0.2 to 5 mm apart from the outer circumferential surface of the one end.

The fixing part may be fixed to the feed roller to reduce an overlap of the first guide part and the second guide part with an electrode active material layer on the first electrode plate or the second electrode plate.

The first guide part may have a tilted curved surface such that a distance between the tilted curved surface and the feed roller decreases as the tilted curved surface approaches the entering part along a traveling direction of the electrode tabs. The first guide part may have a tilted curved surface that gets closer to the feed roller as it approaches the entering part along a traveling direction of the electrode tabs.

A radius of the first guide part may be equal to or greater than a length of each of the electrode tabs.

The first guide part may have a planar inclined surface such that a distance between the planar inclined surface and the feed roller decreases as the planar inclined surface approaches the entering part along a traveling direction of the electrode tabs. The first guide part may have a planar inclined surface that gets closer to the feed roller as it approaches the entering part along a traveling direction of the electrode tabs.

A vertical height and a horizontal length of the first guide part with respect to the traveling direction of the electrode tabs may be equal to or greater than respective lengths of the electrode tabs.

The first guide part may have a planar surface substantially parallel with a traveling direction of the electrode tabs.

The first guide part may have a planar surface substantially perpendicular to a traveling direction of the electrode tabs.

The first guide part may have a ring shape substantially parallel with a rotation axis of the feed roller.

The device may further include a plurality of supply units configured to supply the separator, the first electrode plate and the second electrode plate.

As described herein, in the electrode plate winding device according to embodiments of the present invention, a defect ratio of an electrode assembly can be reduced by allowing an electrode plate to travel in a more secure manner.

In addition, the electrode plate winding device according to embodiments of the present invention can improve manufacturability of products by allowing a base material to travel at a high speed.

BRIEF DESCRIPTION OF THE DRAWINGS

Features of embodiments of the present disclosure will become apparent to those of skill in the art from the description of exemplary embodiments with reference to the accompanying drawings in which.

DETAILED DESCRIPTION

Figure 1:
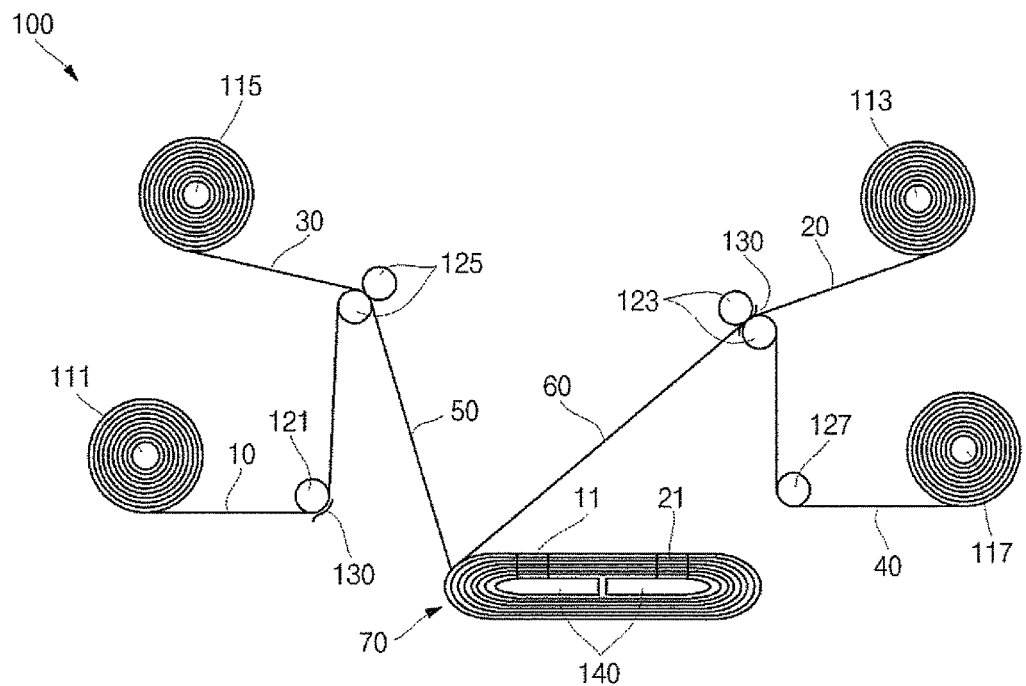
FIG. 1 is a schematic diagram illustrating a device for winding an electrode plate according to an embodiment of the present invention.

Example embodiments are described more fully hereinafter with reference to the accompanying drawings. In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Additionaly, in the context of the present application, when a first element is referred to as being "coupled to" or "connected to" a second element, it can be directly coupled to or connected to the second element or be indirectly coupled to or connected to the second element with one or more intervening elements interposed therebetween. Like reference numerals designate like elements throughout the specification.

Figure 2:
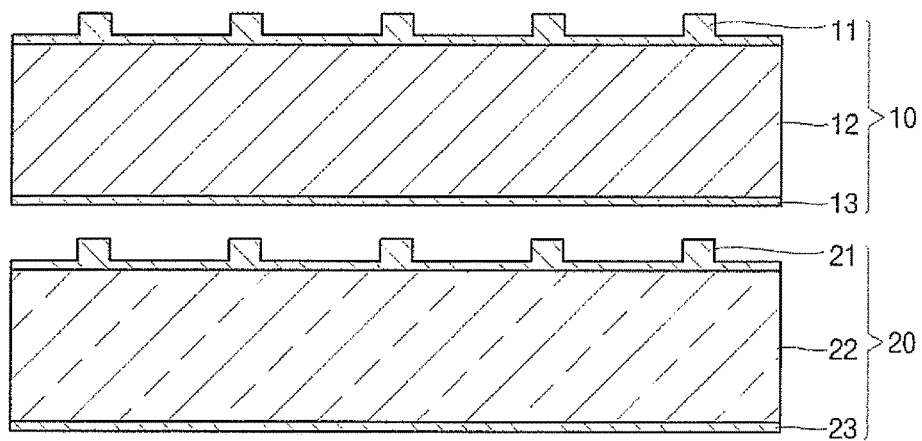
FIG. 2 is a schematic diagram illustrating a first electrode plate and a second electrode plate according to an embodiment of the present invention.
Figure 3:
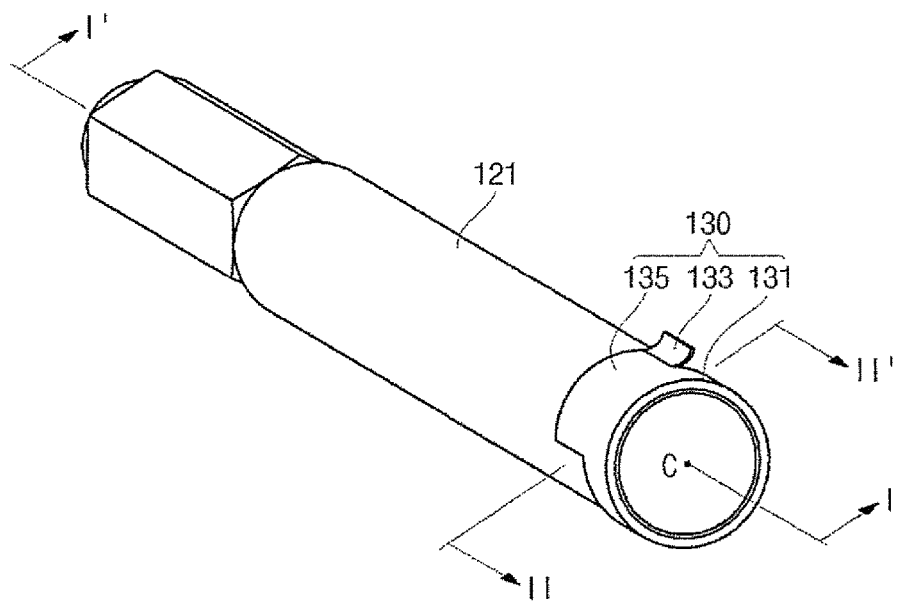
FIG. 3 is a perspective view illustrating a coupling or connection mechanism of a transfer roller and a deformation reducing (or preventing) member according to an embodiment of the present invention.
Figure 4:
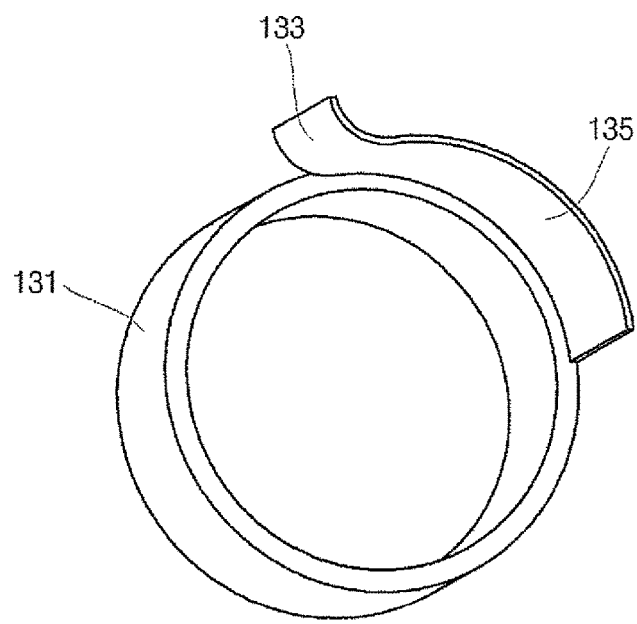
FIG. 4 is a perspective view illustrating a deformation reducing (or preventing) member according to an embodiment of the present invention.
Figure 5:
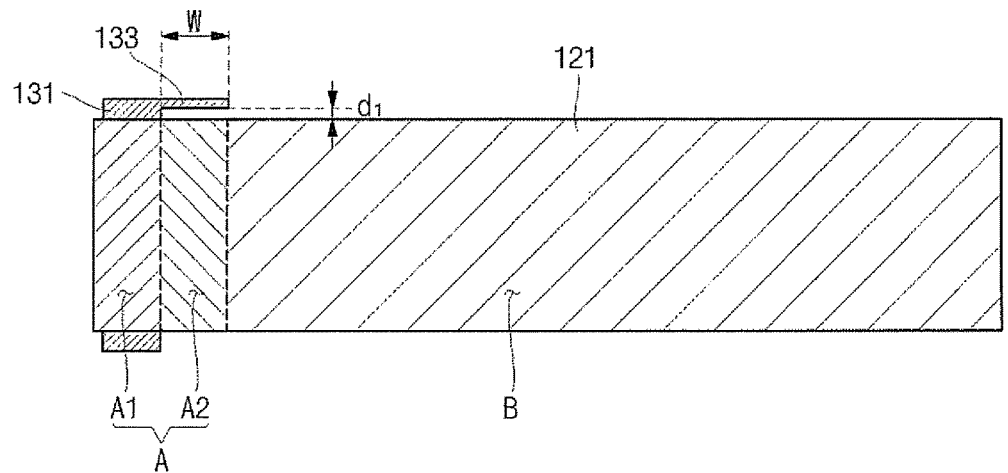
FIG. 5 is a cross-sectional view taken along the line I-I' shown in FIG. 3.
Figure 6:
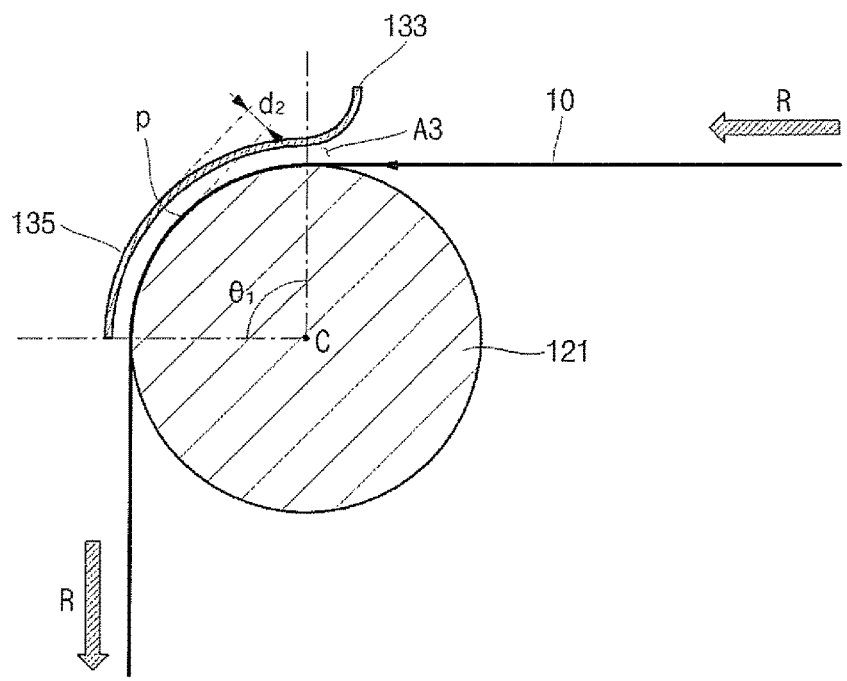
FIG. 6 is a cross-sectional view taken along the line II-II' shown in FIG. 3.
Figure 7:
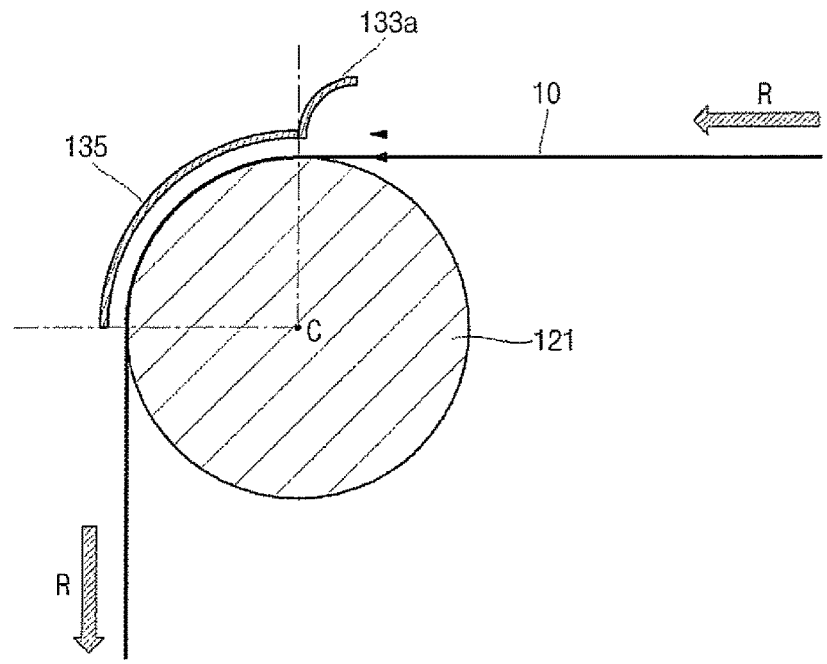
FIG. 7 illustrates another embodiment of a first guide part shown in FIG. 6.
Figure 8:
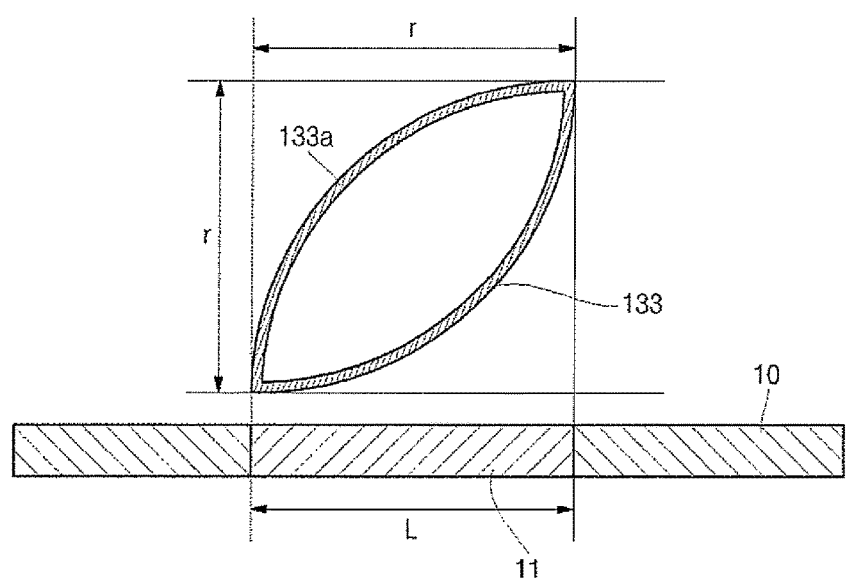
FIG. 8 illustrates a radius formed by a first guide part and a second guide part shown in FIGS. 6 and 7.

FIG. 1 is a schematic diagram illustrating a device for winding an electrode plate according to an embodiment of the present invention, FIG. 2 is a schematic diagram illustrating a first electrode plate and a second electrode plate according to an embodiment of the present invention, FIG. 3 is a perspective view illustrating a coupling or connection mechanism of a transfer roller and a deformation reducing (or preventing) member according to an embodiment of the present invention, FIG. 4 is a perspective view illustrating a deformation reducing (or preventing) member according to an embodiment of the present invention, FIG. 5 is a cross-sectional view taken along the line I-I' shown in FIG. 4, FIG. 6 is a cross-sectional view taken along the line II-II' shown in FIG. 4, FIG. 7 illustrates another embodiment of a first guide part shown in FIG. 6, FIG. 8 illustrates a radius formed by a first guide part and a second guide part shown in FIGS. 6 and 7, and FIGS. 9 to 13 illustrate other embodiments of a first guide part.

First, referring to FIGS. 1 to 6, the electrode plate winding device 100 according to an embodiment of the present invention includes a plurality of feed rollers 121, 123, 125 and 127, a deformation reducing (or preventing) member 130 and a winding unit 140. In addition, the electrode plate winding device 100 may also include first to fourth supply units 111, 113, 115 and 117.

The first supply unit 111 supplies the wound first electrode plate 10, the second supply unit 113 supplies the wound second electrode plate 20, the third supply unit 115 supplies the wound first separator 30, and the fourth supply unit 117 supplies the wound second separator 40.

As shown in FIG. 2, the first electrode plate 10 may include a first coated portion 12, a plurality of first electrode tabs 11 and a first electrode uncoated portion 13. The first coated portion 12 may have a first electrode active material coated on both surfaces or one surface of the first electrode plate 10. The first electrode tabs 11 are regions that are not coated with the first electrode active material and may protrude from one side of the first electrode plate 10 at constant or substantially constant intervals. For example, the first electrode tabs 11 may be spaced apart from one another by a set distance. The first electrode uncoated portion 13 may correspond to an other side of the first electrode plate 10, which is not coated with the first electrode active material. For example, both sides of the first electrode plate 10 at the first electrode uncoated portion 13 may be free or substantially free of the first electrode active material.

As shown in FIG. 2, the second electrode plate 20 may include a second coated portion 22, a plurality of second electrode tabs 21 and a second electrode uncoated portion 23. The second coated portion 22 may have a second electrode active material coated on both surfaces or one surface of the second electrode plate 20. The second electrode tabs 21 are regions that are not coated with the second electrode active material and may protrude from one side of the second electrode plate 20 at constant or substantially constant intervals. For example, the second electrode tabs 21 may be spaced apart from one another by a set distance. The second electrode uncoated portion 23 may correspond to the other side of the second electrode plate 20, which is not coated with the second electrode active material. For example, both sides of the second electrode plate 20 at the second electrode uncoated portion 23 may be free or substantially free of the second electrode active material.

The first and second electrode tabs 11 and 21 may have (or be formed to have) suitable or desired shapes using a notching device based on or utilizing a molding method or a laser method. In FIG. 2, the first and second electrode tabs 11 and 21 having rectangular shapes are illustrated, but the first and second electrode tabs 11 and 21 are not limited thereto. For example, the first and second electrodes 11 and 21 may have any suitable shape, for example, that of polygons, such as trapezoids.

The first and second separators 30 and 40 are interposed between the first and second electrode plates 11 and 21 and may prevent short circuits between the first and second electrode plates 11 and 21 (or reduce a likelihood or amount of such short circuits). Widths of the first and second separators 30 and 40 may be greater than widths of the first and second electrode plates 11 and 21, which is advantageous in preventing short circuits between the first and second electrode plates 11 and 21 (or in reducing a likelihood or amount of such short circuits).

The first to fourth supply units 111, 113, 115 and 117 may unwind the respective wound base materials and may supply the same to the winding unit 140 through the feed rollers 121, 123, 125 and 127, respectively.

In an embodiment of the present invention, constituent materials of the first electrode plate 10, the second electrode plate 20, the first separator 30 and the second separator 40 are not particularly limited. However, in an embodiment of the present invention, the first electrode plate 10 and the second electrode plate 20 including the first electrode tabs 11 and the second electrode tabs 21 are configured to provide multiple or a plurality of first and second tabs 11 and 21 of the electrode assembly 70.

The feed rollers 121, 123, 125 and 127 include first to fourth feed rollers 121, 123, 125 and 127, respectively.

The first feed roller 121 may guide the first electrode plate 10 that is unwound from the first supply unit 111 to be transferred (e.g., to the winding unit 140). The second feed roller 123 may guide the second electrode plate 20 that is unwound from the second supply unit 113 to be transferred (e.g., to the winding unit 140). The third feed roller 125 may guide the first separator 30 that is unwound from the third supply unit 115 to be attached to the first electrode plate 10 to form a first electrode plate 50 having the first separator 30 attached thereto to be transferred to the winding unit 140. The fourth feed roller 127 may guide the second separator 40 that is unwound from the fourth supply unit 117 to be attached to the second electrode plate 20 to form a first electrode plate 60 having the first separator 30 attached thereto to be transferred to the winding unit 140.

The deformation reducing (or preventing) member 130 is coupled to each of the first and second feed rollers 121 and 123 and may prevent (or reduce) deformation of the first and second electrode tabs 11 and 21 while the first and second electrode plates 10 and 20 pass the first and second feed rollers 121 and 123. Here, in this embodiment, the deformation of the first and second electrode tabs 11 and 21 may mean that the first and second electrode tabs 11 and 21 droop or sag as a result of gravity while the first and second electrode plates 10 and 20 pass the first and second feed rollers 121 and 123 or portions thereof are lifted and folded due to fluctuation, a centrifugal force or inertia. In FIG. 1, the deformation reducing (or preventing) member 130 coupled to the first and second feed rollers 121 and 123 is illustrated, but aspects or embodiments of the present invention are not limited thereto. A deformation reducing (or preventing) member may be coupled to each of the feed rollers that the first and second electrode plates 10 and 20 respectively pass. However, for brevity, the following description will be made with regard to an embodiment where the deformation reducing (or preventing) member 130 is coupled to the first feed roller 121.

As shown in FIGS. 3 and 4, the deformation reducing (or preventing) member 130 may include a fixing part 131, a first guide part 133 and a second guide part 135.

First, as shown in the cross-sectional view of FIG. 5, the first feed roller 121 may be largely divided into a first area A and a second area B. The first area A may be an area corresponding to one end of the first feed roller 121. The first area A may further be divided into a fixing area A1 and a tab passing area A2. The fixing area A1 may mean an area to which the deformation reducing (or preventing) member 130 is fixed and which is not rotated along a rotation axis of the roller. The tab passing area A2 may mean an area by which the first electrode tabs 11 pass. As shown in the cross-sectional view of FIG. 6, the tab passing area A2 may include an entering part A3 that is a part of the tab passing area A2, through which the first electrode tabs 11 enter (e.g., enter for the first time). The second area B may mean an area by which the first coated portion 12 of the first electrode plate 10 passes.

The fixing part 131 may be coupled to the fixing area A1 and may have a shape of a ring (e.g., may be shaped of a ring) so as to be easily coupled to the first feed roller 121. In some embodiments, the fixing part is coupled to the one end of the feed roller so as not to be rotated with the feed roller.

The first guide part 133 may be coupled to or connected to the fixing part 131 to be spaced a first distance D1 apart from an outer circumferential surface of the tab passing area A2 and may be positioned at or in the entering part A3. The first distance D1 may be set to allow the first electrode tabs 11 to pass the tab passing area A2 and/or the first guide part 133 well enough in consideration of thicknesses of the first electrode tabs 11. For example, when the thickness of the first electrode plate 10 is in a range of approximately 5 μm to 20 μm, the first distance d1 may be in a range of approximately 0.2 mm to 5 mm, but the first distance is not limited thereto. In addition, the first guide part 133 may have a width W set such that the first guide part 133 does not go beyond the second area B. For example, the width W may be set such that the first guide part 133 does not protrude or substantially protrude into the second area B. To this end, the fixing part 131 is fixed or importantly fixed at a suitable or appropriate position of the fixing area A1 to prevent the first guide part 133 from going beyond the second area B (or to reduce a likelihood or amount of such an occurrence). If the first guide part 133 is positioned to be at the second area B (or substantially protrudes into the second area B), the first electrode active material of the first coated portion 12 may contaminate the first guide part 133, thereby adversely affecting the first electrode tabs 11.

As shown in FIG. 6, the first guide part 133 may have a tilted curved surface that gets closer to the feed roller 121 as it approaches the entering part A3 along a traveling direction R of the first electrode plate 10. For example, a distance between the tilted curved surface and the feed roller may decrease as the tilted curved surface approaches the entering part A3 along the traveling direction R of the electrode tabs. As shown in FIG. 6, the tilted curved surface may be convex toward the first electrode plate 10. As shown in FIG. 7, a first guide part 133a may have a tilted curved surface that may be convex away from the first electrode plate 10.

According to embodiments of the present disclosure, even if fluctuation occurs while the first electrode plate 10 travels and deformation occurs to the first electrode tabs 11, such as folding or vibration, due to the tension of base materials, the tilted curved surface of the first guide part 133 or the tilted curved surface of the first guide part 133a guides the first electrode tabs 11 to enter an area between the first guide part 133 or the first guide part 133a and the outer circumferential surface of the tab passing area A2 through the entering part A3, thereby preventing (or reducing) deformation of the first electrode tabs 11.

As shown in FIG. 8, each of the first guide parts 133 and 133a may have a suitable or appropriate radius r, which is equal to or greater than a length L of the first electrode tab 11. If the radius r of each of the first guide parts 133 and 133a is shorter than the length L of the first electrode tab 11, then folded tabs may be lifted to upper portions of the first guide parts 133 and 133a, resulting in tearing of the first guide parts 133 and 133a. Therefore, in some embodiments, in order to prevent the first electrode tab 11 from being lifted to the upper portions of the first guide parts 133 and 133a (or to reduce such lift), the first guide parts 133 and 133a each have the radius r equal to or greater than the length L of the first electrode tab 11.

Figure 9:
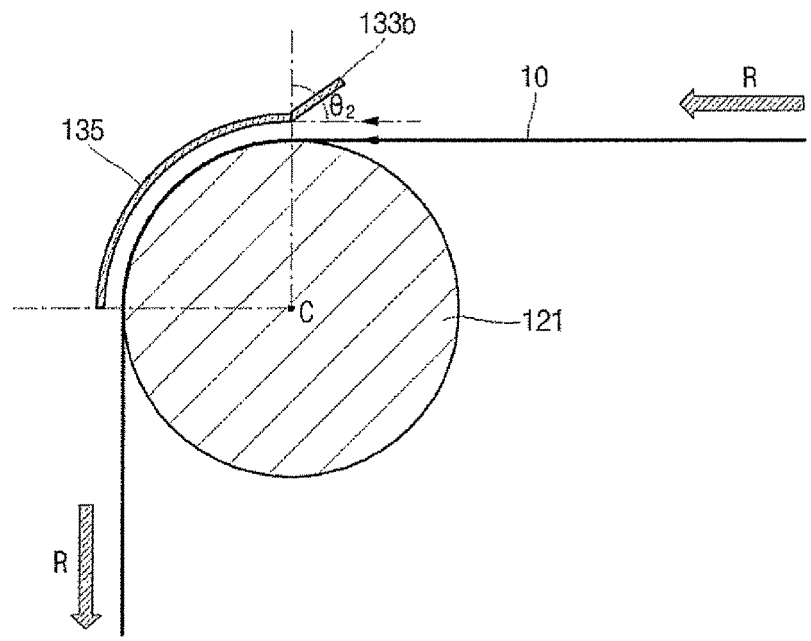
FIGS. 9 to 13 illustrate other embodiments of a first guide part.
Figure 10:
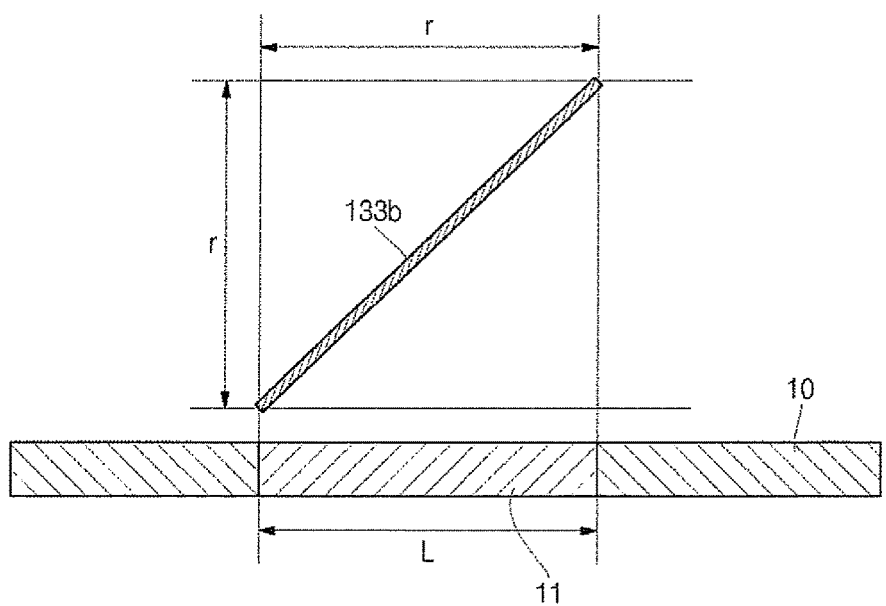

Meanwhile, as shown in FIG. 9, a first guide part 133b may have or be formed to have a planar tilted surface. A tilt angle θ2 of the first guide part 133b may be less than or not greater than 90°. For example, in some embodiments, 0<θ2<90°. In addition, as shown in FIG. 10, a vertical height r and a horizontal length r of the first guide part 133b may be equal to or greater than the length L of the first electrode tab 11.

If the vertical height r and/or the horizontal length r of the first guide part 133b are each smaller than or less than the length L of the first electrode tab 11, a folded tab may be lifted to an upper portion of the first guide part 133b, resulting in tearing of the first electrode tab 11. Therefore, in some embodiments, in order to prevent the first electrode tab 11 from being lifted to the upper portion of the first guide part 133b (or to reduce such lift), the first guide part 133b has the vertical height r and/or the horizontal length r equal to or greater than the length L of the first electrode tab 11.

Figure 11:
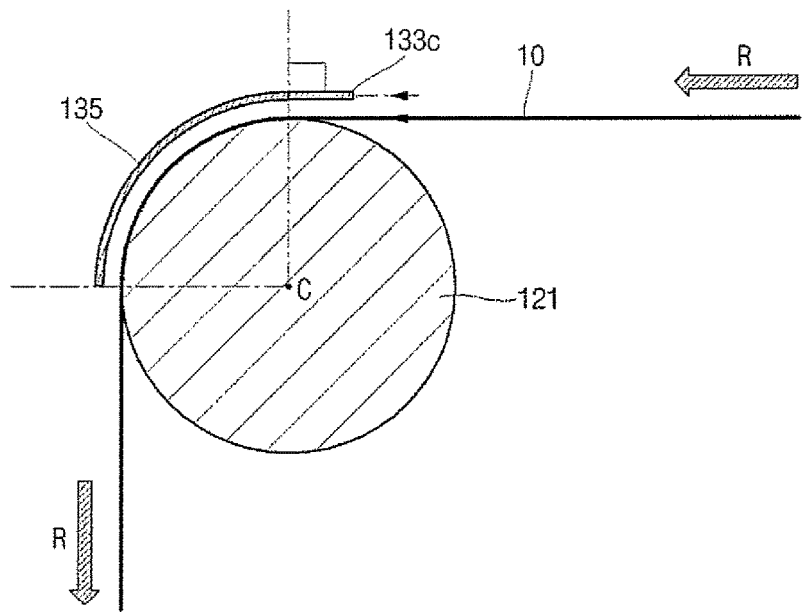

As shown in FIG. 11, a first guide part 133c may have or be formed to have a planar surface parallel or substantially parallel with or to a traveling direction R of a first electrode plate 10.

Figure 12:
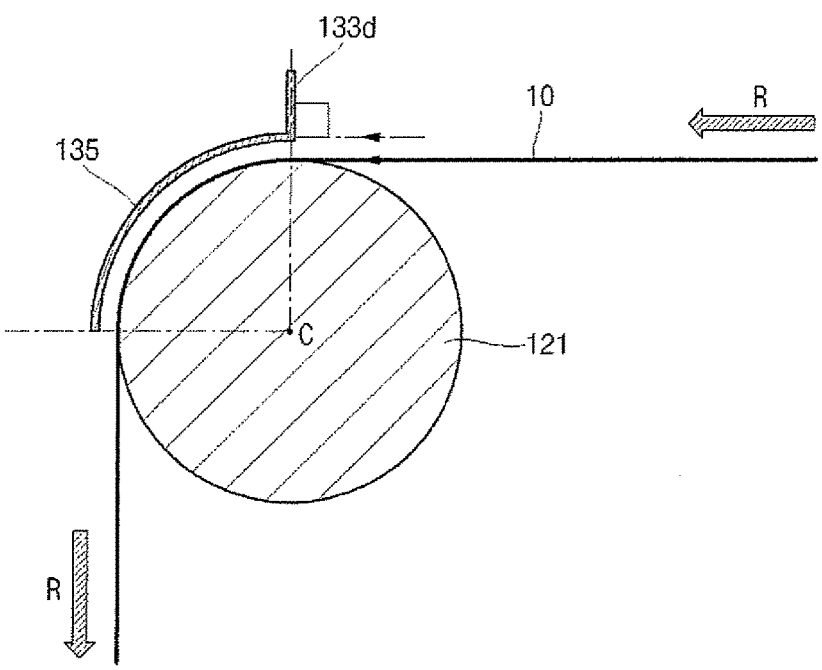

As shown in FIG. 12, a first guide part 133d may have or be formed to have a planar surface perpendicular or substantially perpendicular to a traveling direction R of a first electrode plate 10.

Figure 13:
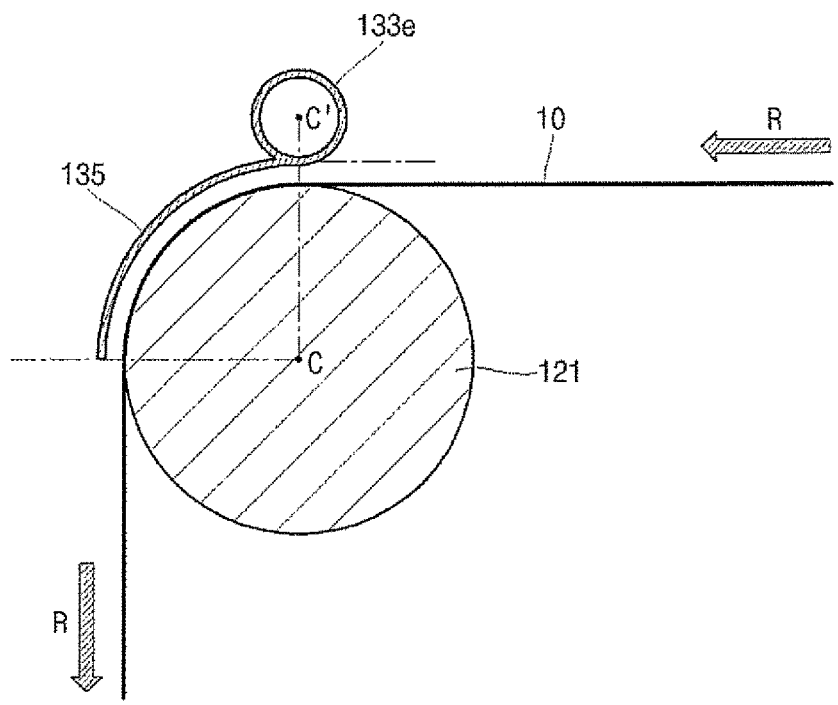

As shown in FIG. 13, a first guide part 133e may be formed to have a ring disposed to be parallel or substantially parallel with or to the first feed roller 121. Here, a central axis C' of the ring and a rotation axis C of the first feed roller 121 may be parallel or substantially parallel with or to each other.

As shown in FIGS. 3, 4 and 6, the second guide part 135 may extend from the first guide part 133 and may be coupled to or connected to the fixing part 131 to be spaced a second distance d2 apart from the outer circumferential surface of the tab passing area A2 along the outer circumferential surface. The second distance d2 may be in a range of approximately 0.2 mm to 5 mm, like the first distance d1, but the second distance is not limited thereto. The second guide part 135 may have or be shaped to have an arc shape corresponding to a contact surface P of the outer circumferential surface of the tab passing area A2 making contact with the first electrode tab 11. A length of the arc may vary according to an angle θ1 formed by opposite ends of the contact surface P in view of the rotation axis C of the first feed roller 121.

The second guide part 135 may have a suitable or appropriate width for the second guide part 135 not to exceed the second area B. For example, the width of the second guide part 135 may be set such that the second guide part 135 does not protrude or substantially protrude into the second area B. To this end, the fixing part 131 may be fixed or importantly fixed at a suitable or appropriate position of the fixing area A1 to prevent the second guide part 135 from exceeding the second area B (or to reduce a likelihood or amount of such occurrence). If the second guide part 135 is positioned in the second area B (or substantially protrudes into the second area B), a first electrode active material of the first coated portion 12 may contaminate the second guide part 135, thereby adversely affecting the first electrode tab 11. The width of the second guide part 135 may be the same or substantially the same as the width W of the first guide part 133.

The second guide part 135 may guide the first electrode tab 11 to pass an area between the first guide part 133 and the outer circumferential surface of the tab passing area A2 in a state in which the first electrode tab 11 makes close contact (e.g., direct or physical contact) with the outer circumferential surface by the first guide part 133, thereby preventing (or reducing) deformation of the first electrode tab 11.

The winding unit 140 may include a mandrel. The winding unit 140 may wind the first electrode plate 50 having the first separator 30 attached thereto and the second electrode plate 60 having the second separator 40 attached thereto in a jelly-roll configuration while rotating the mandrel.

Figure 14:
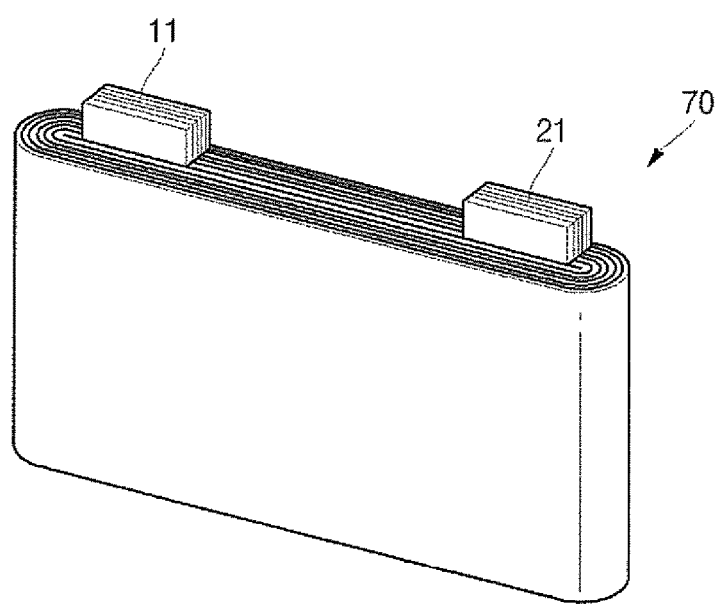
FIG. 14 is a perspective view of an electrode assembly fabricated using an electrode plate winding device according to an embodiment of the present invention.

FIG. 14 is a perspective view of an electrode assembly fabricated using an electrode plate winding device according to an embodiment of the present invention.

According to an embodiment of the present invention, as shown in FIG. 14, an electrode assembly 70 including multiple tabs 11 and 21 protruding to be parallel or substantially parallel with or to a winding axis may be fabricated. The multiple tabs 11 and 21 may include a plurality of first and second electrode tabs 11 and 21 and may serve as electrode current collectors of the electrode assembly 70.

The deformation reducing (or preventing) member according to an embodiment of the present invention allows an electrode plate to travel in a more secure manner without folding of electrode tabs, thereby reducing a defect ratio or defect rate of the electrode assembly.

In addition, the deformation reducing (or preventing) member according to an embodiment of the present invention may be applied to a winding device including roll-to-roll equipment capable of transferring a base material at a traveling speed of 100 m/s or greater. As described above, high manufacturability of products can be achieved using the equipment requiring high-speed traveling of a base material.

Example embodiments have been disclosed herein, and although specific terms are employed, they are used, and are to be interpreted in, a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments, unless otherwise indicated. Accordingly, it will be understood by those of skill in the art that various changes in form and details may be made without departing from the spirit and scope of the present invention as set forth in the following claims, and equivalents thereof.

What is claimed is:

1. A device for winding an electrode plate, comprising:
   a feed roller configured to guide a first electrode plate or a second electrode plate, each of the first electrode plate and the second electrode plate comprising a plurality of electrode tabs protruding from one side;
   a deformation reducing member spaced apart from an outer circumferential surface of one end of the feed roller and configured to guide the electrode tabs fed to the feed roller to be brought into close contact with the outer circumferential surface of the one end of the feed roller to reduce deformation of the electrode tabs; and
   a winding unit configured to wind together the first electrode plate or the second electrode plate transferred by the feed roller and a separator interposed between the first electrode plate and the second electrode plate.

2. The device as claimed in claim 1, wherein the deformation reducing member comprises:
   a fixing part coupled to the one end of the feed roller so as not to be rotated with the feed roller; and
   a first guide part coupled to the fixing part to be spaced apart from the outer circumferential surface of the one end and positioned at an entering part at which the electrode tabs enter while making contact with the feed roller for the first time.

3. The device as claimed in claim 2, wherein the fixing part has a ring shape corresponding to the one end of the feed roller.

4. The device as claimed in claim 2, further comprising a second guide part extending from the first guide part and coupled to the fixing part to be spaced apart from the outer circumferential surface of the one end along the outer circumferential surface of the one end.

5. The device as claimed in claim 4, wherein the second guide part has an arc shape corresponding to portions of the outer circumferential surface of the one end, the portions being configured to make contact with the electrode tabs.

6. The device as claimed in claim 4, wherein the second guide part is spaced 0.2 to 5 mm apart from the outer circumferential surface of the one end.

7. The device as claimed in claim 4, wherein the fixing part is fixed to the feed roller to reduce an overlap of the first guide part and the second guide part with an electrode active material layer on the first electrode plate or the second electrode plate.

8. The device as claimed in claim 2, wherein the first guide part has a tilted curved surface such that a distance between the tilted curved surface and the feed roller decreases as the tilted curved surface approaches the entering part along a traveling direction of the electrode tabs.

9. The device as claimed in claim 8, wherein a radius of the first guide part is equal to or greater than a length of each of the electrode tabs.

10. The device as claimed in claim 2, wherein the first guide part has a planar inclined surface such that a distance between the planar inclined surface and the feed roller decreases as the planar inclined surface approaches the entering part along a traveling direction of the electrode tabs.

11. The device as claimed in claim 10, wherein a vertical height and a horizontal length of the first guide part with respect to the traveling direction of the electrode tabs are each equal to or greater than respective lengths of the electrode tabs.

12. The device as claimed in claim 2, wherein the first guide part has a planar surface substantially parallel with a traveling direction of the electrode tabs.

13. The device as claimed in claim 2, wherein the first guide part has a planar surface substantially perpendicular to a traveling direction of the electrode tabs.

14. The device as claimed in claim 2, wherein the first guide part has a ring shape substantially parallel with a rotation axis of the feed roller.

15. The device as claimed in claim 1, further comprising a plurality of supply units configured to supply the separator, the first electrode plate and the second electrode plate.

* * * * *